United States Patent [19]
Winter et al.

[11] 3,886,157
[45] May 27, 1975

[54] 5,6,8,8B,9-PENTAAZANAPHTH[3,2,1-D,E]ANTHRACENE DERIVATIVES

[75] Inventors: Roland A. E. Winter, Armonk; Thomas J. Villani, Bronx, both of N.Y.

[73] Assignee: Ciba-Geigy Corporation, Ardsley, N.Y.

[22] Filed: Feb. 28, 1973

[21] Appl. No.: 336,573

Related U.S. Application Data

[63] Continuation-in-part of Ser. No. 129,127, March 29, 1971, abandoned.

[52] U.S. Cl. ............................ 260/256.4 F; 424/251
[51] Int. Cl. ............................................. C07d 51/42
[58] Field of Search ............................. 260/256.4 F

[56] References Cited
UNITED STATES PATENTS
2,970,146    6/1974    Boyle et al. .................. 260/256.4 F

*Primary Examiner*—Donald G. Daus
*Assistant Examiner*—James H. Turnipseed
*Attorney, Agent, or Firm*—Nestor W. Shust

[57] ABSTRACT

Compounds having the formula

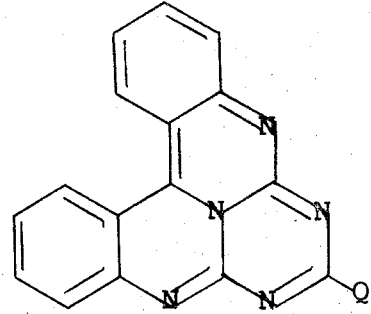

which can be used as cardiovascular agents or in preparing the diamino derivatives which can be used in making polymers such as polyamides and polyimides.

5 Claims, No Drawings

5,6,8,8B,9-PENTAAZANAPHTH[3,2,1-D,E]ANTHRACENE DERIVATIVES

This application is a continuation-in-part of copending application Ser. No. 129,127, filed Mar. 29, 1971, now abandoned.

DETAILED DESCRIPTION

This invention relates to novel 5,6,8,8b,9-pentaazanaphth[3,2,1-d,e]anthracene compounds. These compounds can be represented by the formula

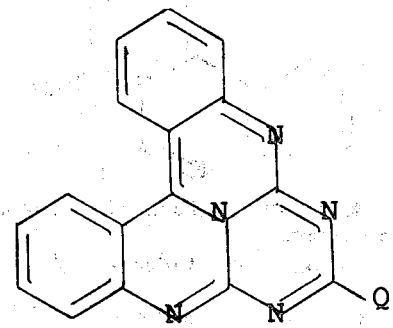

wherein Q is a di(lower)alkyl amino group or phenyl group.

By lower alkyl groups is meant straight or branched chain alkyl groups having up to 6 carbon atoms such as methyl, ethyl, propyl, isopropyl, butyl, sec-butyl, tert-butyl, amyl, tert-amyl, hexyl and the like.

The compounds of this invention are useful as cardiovascular agents, and particularly, as blood pressure lowering agents or as coronary and peripheral vascular dilation agents. When used in this capacity, they may be administered paranterally or orally in any of the usual pharmaceutical forms including tablets, capsules, powders, suspensions, solutions, syrups, and the like.

The following examples will further illustrate the nature of the present invention without introducing any limitations thereto.

EXAMPLE 1

2,4-dichloro-6-dimethylamino-s-triazine

A solution of cyanuric chloride (276.6 g, 1.5 moles) in 700 ml of hot acetone was added at once to a slurry of 1,600 ml of water and 1200 g of crushed ice. With stirring 25% aqueous dimethylamine solution (318 ml, 1.65 moles) was added over a 20 minute period at +5°, followed by a solution of sodium hydroxide (60 g, 1.5 moles) in 60 ml of water over a 20 minute period at 5°. The mixture was stirred for 2 hours at the same temperature, filtered, washed thoroughly with water and recrystallized from 2.4 1., of heptane, yielding 236 g (81.5%) of 2,4-dichloro-6-dimethylamino-s-triazine as lustrous colorless flakes, m.p. 121°–122°, (lit. m.p. 119°–120°).

EXAMPLE 2

2,4-bis(o-carbomethoxyanilino)-6-dimethylamino-s-triazine

A mixture of 2,4-dichloro-6-dimethylamino-s-triazine, 28.9 g, 0.15 moles), methyl anthranilate (54.5 g, 0.36 moles), powdered anhydrous sodium carbonate (42.4 g, 0.4 moles) and 600 ml of toluene was heated at reflux with stirring for 70 hours. The hot reaction mixture was filtered and the salt residue washed with two 30 ml portions of toluene. After crystallization overnight at 0° the white precipitate was filtered, washed with four 25 ml portions of ethanol and dried overnight at 70° at 200 mm Hg, yielding 39.5 g (62%) of white crystalline 2,4-bis-(o-carbomethoxyanilino)-6-dimethylamino-s-triazine, m.p. 172°–173°. An analytical sample m.p. 173°–174° was obtained by recrystallization from dioxane-ethanol.

Analysis Calculated for $C_{21}H_{22}N_6O_4$ (MW 422.4) Calculated: C, 59.70; H, 5.25; N, 19.90 Found: C, 59.59; H, 5.29; N, 19.87.

EXAMPLE 3

7-dimethylamino-5,6,8,8b,9-pentaazanaphth[3,2,1-de]anthracene

A mixture of 2,4-bis(o-carbomethoxyaniline)-6-dimethylamino-s-triazine of Example 2 (21.12 g, 50 moles) and 200 ml of glacial acetic acid or propionic acid was heated at reflux for 16 hours. The yellow solution was cooled to room temperature, filtered to remove the insoluble white byproduct, which was washed with 50 ml of acetic acid. The combined filtrates were concentrated on a rotary evaporator and the residue crystallized from 80% aqueous dioxane and dried overnight at 100°, 0.1 mm Hg, yielding 12.95 g (82%) of 7-dimethylamino-5,6,8,8b,9-pentaazanaphth[3,2,1-de]anthracene, bright yellow needles, m.p. 302°–303°.

Analysis Calculated for $C_{18}H_{14}N_6$ (MW 314.4) Calculated: C, 68.78; H, 4.49; N, 26.73 Found: C, 68.29; H, 4.44; N, 26.97.

EXAMPLE 4

7-dimethylamino-5,6,8,8b,9-pentaazanaphth[3,2,1-de]anthracene

A mixture of 2,4-dichloro-6-dimethylamino-s-triazine (97 g, 0.5 moles) and methyl anthranilate (151 g, 1 mole) in 1,000 ml of anisole was heated at reflux for 16 hours. The precipitate, consisting of pentaazanaphthanthracene hydrochloride, 67.2 g, (37.7%) was filtered off. The solvent was removed from the filtrate and the residue of crude dianthranilato-s-triazine was heated at reflux with 1,000 ml of acetic acid overnight. The mixture was filtered, the filtrate evaporated and the residue recyystallized from 80% aqueous dioxane, yielding 50.1 g (32.8%) of 7-dimethylamino-5,6,8,8b,9-pentaazanaphth[3,2,1-de]-anthracene, m.p. 302°–303°.

EXAMPLE 5

7-dimethylamino-5,6,8,8b,9-pentaazanaphth[3,2,1-de]anthracene monohydrochloride

Into the deep yellow solution of 1.57 g, 20 mmoles of the pentaazanaphthanthracene derivative, in 250 ml of dry methylene chloride was bubbled a stream of hydrogen chloride for one minute at room temperature. A lemon yellow precipitate formed immediately and the supernatant liquid turned colorless. The precipitate was filtered, washed with 50 ml of methylene chloride and dried for 48 hours at 60°, 200 mm Hg furnishing the title compound, in quantitative yield, m.p. dec. 354°–356°.

Analysis Calculated for $C_{18}H_{14}N_6 \cdot xHCl$ (MW 350.81) Calculated: C, 61.62; H, 4.31; Cl, 10.10; N, 23.96 Found: C, 61.56; H, 4.40; Cl, 10.11; N, 23.90.

EXAMPLE 6

Nitration of the pentaazanaphthanthracene derivative

To 7 ml of a mixture prepared from equal volumes of concentrated sulfuric acid and 70% nitric acid was added dropwise at room temperature a solution of 3.14 g (10 moles) of 7-dimethylamino-5,6,8,8b,9-pentaazanaphth[3,2,1-de]anthracene in 20 ml of concentrated sulfuric acid. The mixture was allowed to stand at room temperature for one hour, then poured onto a mixture of ice and water. The orange precipitate was filtered, washed successively with water, hot dimethylformamide and ethanol, dried for 24 hours at 140°, 0.1 mm Hg, yielding 3.19 g (79%) of the dinitroderivative, m.p. dec 375°.

Analysis Calculated for $C_{18}H_{12}N_8O_4 \cdot 0.3\ H_2O$ (MW 409.75) Calculated: C, 52.76; H, 3.10; N, 27.35 Found: C, 52.76; H, 3.25; N, 27.73.

The compounds of this invention are useful as dyestuffs capable of imparting bright orange color to the substrate. Furthermore, these compounds can be oxidized by standard oxidation techniques (e.g., chromic anhydride in acetic acid; sodium chlorate in the presence of vanadium pentoxide, glacial acetic acid and dilute sulfuric acid; or by first introducing an amino group which in turn is oxidized by sodium dichromate and sulfuric acid) to form quinone groups on the benzene rings. The resulting compounds would be also useful as dyestuffs with deeper color properties depending on the exact structure of the specific compound. The compounds of this invention can be also used in preparing polyamides or polyimides by first aminating these compounds and thereafter reacting the amino compounds with anhydrides or acids.

What is claimed is:

1. A compound represented by the formula

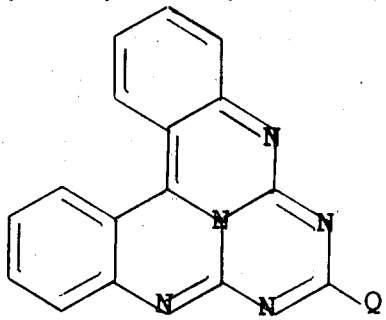

wherein Q is di(lower)alkyl amino having up to six carbon atoms or phenyl.

2. A compound of claim 1 wherein said Q is di(lower)alkyl amino.

3. The compound of claim 2 wherein said (lower)alkyl groups are methyl.

4. The monohydrochloride of the compound of claim 3.

5. The dinitro derivative of the compound of claim 3.

* * * * *